US 8,797,609 B2

(12) United States Patent
Shimoda et al.

(10) Patent No.: US 8,797,609 B2
(45) Date of Patent: Aug. 5, 2014

(54) IMAGE SENSOR UNIT AND IMAGE READING APPARATUS

(75) Inventors: Shuuichi Shimoda, Saitama (JP);
Tomoyuki Horiguchi, Saitama (JP);
Hidemasa Yoshida, Saitama (JP);
Akifumi Fujiwara, Saitama (JP);
Hidehisa Takahashi, Saitama (JP)

(73) Assignee: Canon Components, Inc. (JP)

(*) Notice: Subject to any disclaimer, the term of this patent is extended or adjusted under 35 U.S.C. 154(b) by 8 days.

(21) Appl. No.: 13/570,645

(22) Filed: Aug. 9, 2012

(65) Prior Publication Data

US 2013/0038913 A1    Feb. 14, 2013

(30) Foreign Application Priority Data

Aug. 9, 2011  (JP) ................................. 2011-174375
Jul. 20, 2012  (JP) ................................. 2012-161534

(51) Int. Cl.
*H04N 1/04*  (2006.01)

(52) U.S. Cl.
USPC ........... 358/474; 358/475; 358/509; 382/115; 382/128; 399/289; 348/E5.028

(58) Field of Classification Search
CPC .. G02B 6/0038; G02B 6/0046; G02B 6/0053; G02B 6/0068; G02B 6/0021; G02B 6/0073; G02B 6/0078; G02B 6/002; G02B 6/003; G02B 6/0031; G02B 6/0043; G02B 6/0061; F21S 2/00; F21S 8/00; F21V 23/06; A61B 1/06; A61B 1/04; A61B 1/00; A61B 6/00; A61B 1/12; A61B 3/12; A61B 18/18; A61B 1/015; A61B 1/045; A61B 1/05; A61B 1/055; A61B 1/07; A61B 3/14; A61B 5/00; H04N 1/04; H04N 13/00

USPC ......... 358/474, 475, 488, 509, 496, 497, 448, 358/512; 348/E13, E5.028; 382/115, 128, 382/130, 133; 399/222, 89

See application file for complete search history.

(56) References Cited

U.S. PATENT DOCUMENTS 4,807,026 A * 2/1989 Nishioka et al. ................ 348/70
5,119,232 A   6/1992 Daley et al.

(Continued)

FOREIGN PATENT DOCUMENTS

EP    0 252 709 A2    1/1988
EP    0 557 891 A1    9/1993

(Continued)

OTHER PUBLICATIONS

Extended European Search Report for EP 11194502.8, mail date Dec. 4, 2012. Cited related co-pending U.S. Appl. No. 13/328,553.

(Continued)

*Primary Examiner* — Negussie Worku
(74) *Attorney, Agent, or Firm* — Rossi, Kimms & McDowell LLP

(57) ABSTRACT

An image sensor unit includes a reflection reading light guide that emits light from a reflection reading light source toward the bill, a transmission reading light guide that emits light from a transmission reading light source toward the bill, an imaging element that focuses light from the bill, and a light receiving element that receives light that is collected by the imaging element. The transmission reading light source and the transmission reading light guide are disposed on the opposite side of a conveyance path through which the bill can pass, for the reflection reading light source and the reflection reading light guide, and a light blocking member that blocks a part of the light from the reflection reading light guide is disposed between the reflection reading light guide and the transmission reading light guide.

6 Claims, 16 Drawing Sheets

(56) References Cited

U.S. PATENT DOCUMENTS

| | | | |
|---|---|---|---|
| 5,673,122 A | 9/1997 | Omori | |
| 5,864,408 A | 1/1999 | Kumashiro | |
| 5,910,816 A * | 6/1999 | Fontenot et al. | 348/65 |
| 6,427,440 B1 * | 8/2002 | Bonny et al. | 60/323 |
| 6,501,087 B1 | 12/2002 | Koretsune et al. | |
| 6,527,440 B1 * | 3/2003 | Jenkins | 374/161 |
| 6,635,011 B1 * | 10/2003 | Ozawa et al. | 600/178 |
| 6,724,503 B1 * | 4/2004 | Sako et al. | 358/483 |
| 7,042,598 B2 | 5/2006 | Payne | |
| 7,284,891 B2 | 10/2007 | Saito et al. | |
| 7,365,268 B2 * | 4/2008 | Collins et al. | 174/50 |
| 7,679,793 B2 * | 3/2010 | Oguchi | 358/487 |
| 7,683,926 B2 * | 3/2010 | Schechterman et al. | 348/42 |
| 7,722,223 B2 | 5/2010 | Saito et al. | |
| 7,796,310 B2 * | 9/2010 | Hasegawa et al. | 358/488 |
| 7,859,726 B2 | 12/2010 | Endo et al. | |
| 7,907,169 B2 * | 3/2011 | Sugimoto | 348/65 |
| 8,199,377 B2 * | 6/2012 | Wakisaka et al. | 358/475 |
| 8,442,091 B2 * | 5/2013 | Park et al. | 372/76 |
| 8,508,812 B2 * | 8/2013 | Iwayama | 358/475 |
| 8,564,854 B2 * | 10/2013 | Kawano et al. | 358/475 |
| 2006/0152942 A1 | 7/2006 | Saito et al. | |
| 2006/0268346 A1 | 11/2006 | van Os | |
| 2007/0133858 A1 | 6/2007 | Endo et al. | |
| 2007/0285740 A1 | 12/2007 | Onishi et al. | |
| 2008/0068682 A1 | 3/2008 | Morikawa | |
| 2008/0112017 A1 | 5/2008 | Nagasaka | |
| 2009/0003000 A1 | 1/2009 | Saito et al. | |
| 2009/0027743 A1 | 1/2009 | Han | |
| 2009/0294630 A1 | 12/2009 | Saito et al. | |
| 2009/0310193 A1 | 12/2009 | Endo et al. | |
| 2011/0286054 A1 * | 11/2011 | Ueno et al. | 358/475 |
| 2012/0154876 A1 | 6/2012 | Shimoda | |
| 2012/0154877 A1 | 6/2012 | Kisara et al. | |
| 2012/0162727 A1 * | 6/2012 | Shimoda et al. | 358/475 |
| 2012/0287484 A1 | 11/2012 | Shimoda et al. | |
| 2013/0009037 A1 | 1/2013 | Takahashi | |
| 2013/0038912 A1 | 2/2013 | Horiguchi et al. | |
| 2013/0038914 A1 | 2/2013 | Yoshida et al. | |

FOREIGN PATENT DOCUMENTS

| | | |
|---|---|---|
| EP | 0 844 784 A2 | 11/1997 |
| EP | 1 049 055 A2 | 4/2000 |
| EP | 1 049 055 A2 | 11/2000 |
| EP | 1 471 472 A2 | 4/2004 |
| EP | 1 835 469 A2 | 9/2007 |
| EP | 2 246 825 A1 | 4/2009 |
| EP | 2 134 071 A2 | 12/2009 |
| FR | 2 655 799 A1 | 6/1991 |
| JP | 8-223417 A | 8/1996 |
| JP | 09-214675 A | 8/1997 |
| JP | 10-285330 A | 10/1998 |
| JP | 2000-307819 A | 11/2000 |
| JP | 2001-005122 A | 1/2001 |
| JP | 2003-037717 A | 2/2003 |
| JP | 2003-046726 A | 2/2003 |
| JP | 2003-281913 A | 10/2003 |
| JP | 2004-146870 A | 5/2004 |
| JP | 2005-223424 A | 8/2005 |
| JP | 2006-311232 A | 11/2006 |
| JP | 3885088 B2 | 11/2006 |
| JP | 2007-116590 A | 5/2007 |
| JP | 2007-164385 A | 6/2007 |
| JP | 2007-194797 A | 8/2007 |
| JP | 2007194797 A | 8/2007 |
| JP | 2007-300536 A | 11/2007 |
| JP | 2008-42425 A | 2/2008 |
| JP | 2008-112301 A | 5/2008 |
| JP | 2009-086488 A | 4/2009 |
| JP | 2009-301200 A | 12/2009 |
| JP | 2010-136061 A | 6/2010 |
| JP | 2011-124741 A | 6/2011 |
| WO | 2006/137263 A1 | 12/2006 |
| WO | 2007/077760 A1 | 7/2007 |
| WO | 2008/013234 A1 | 1/2008 |

OTHER PUBLICATIONS

Japanese Office Action for JP 2011-236415, mail date Nov. 13, 2012. Cited related co-pending U.S. Appl. No. 13/328,553.

Japanese Office Action for JP 2010-282128, dated Nov. 6, 2012.Cited in related co-pending U.S. Appl. No. 13/328,553.

International Search Report for PCT/JP2010/069500, mail date Nov. 30, 2010. Cited in related co-pending U.S. Appl. No. 13/328,553.

Japanese Office Action for JP 2012-247653, mail date Dec. 11, 2012. Cited in related co-pending U.S. Appl. No. 13/328,553.

Extended European search report issued in corresponding European Patent Application No. 12179608.0 dated Nov. 21, 2012.

Office Action issued in corresponding Japanese Patent Application No. 2012-161534, dated Jul. 2, 2013.

European Office Action for corresponding EP 12179608.0, mail date Mar. 14, 2014.

* cited by examiner

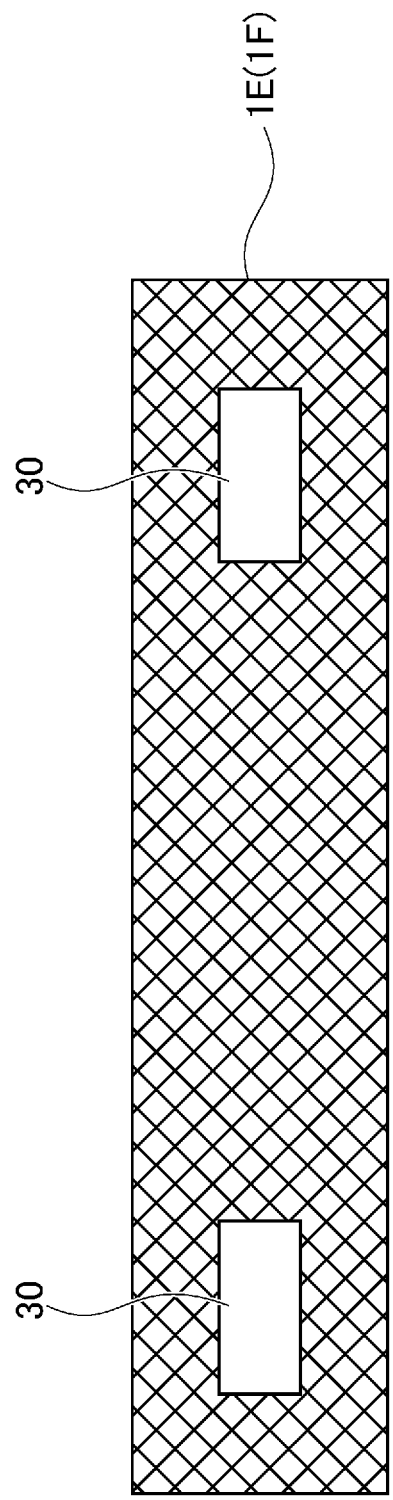
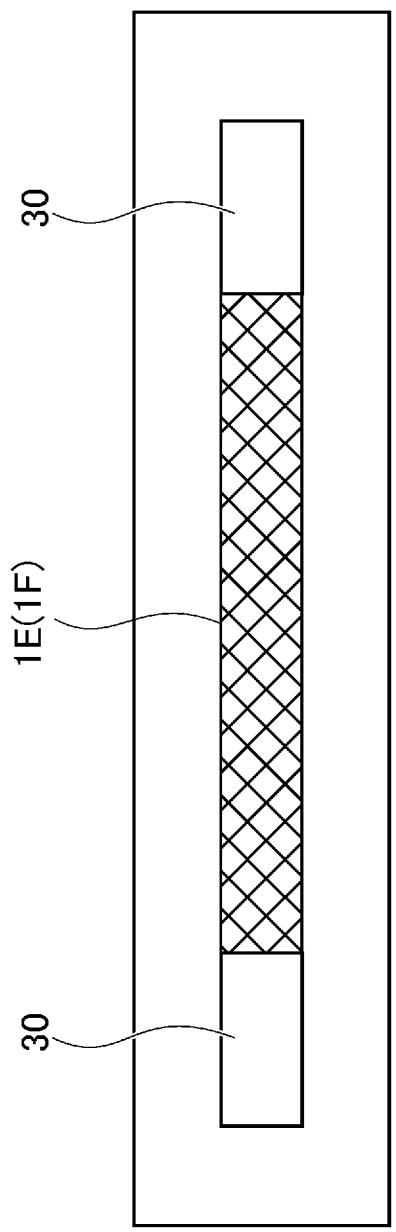

IMAGE SENSOR UNIT AND IMAGE READING APPARATUS

CROSS-REFERENCE TO RELATED APPLICATIONS

This application is based upon and claims the benefit of priority of the prior Japanese Patent Application No. 2011-174375, filed on Aug. 9, 2011, and the Japanese Patent Application No. 2012-161534, filed on Jul. 20, 2012 the entire contents of which are incorporated herein by reference.

BACKGROUND OF THE INVENTION

1. Field of the Invention

The present invention relates to an image sensor unit used in an image reading apparatus such as a copying machine, image scanner, facsimile and so on, and the image reading apparatus using the image sensor unit. In particular, the present invention relates to an image reading apparatus that authenticates a recording medium, such as a bill, security and so on.

2. Description of the Related Art

As this kind of image reading apparatus, for example, an apparatus disclosed in Patent Document 1 is known as an image reading apparatus that, in particular, authenticates a bill, security and so on.

Patent Document 1: Japanese Laid-open Patent Publication No. 2007-194797

However, in the conventional technology disclosed in the aforementioned Patent Document 1, in a state in which an original is not present when performing reflection reading (for example, when there is a gap between bills when reading bills consecutively, or when there is a damaged portion such as a rip or a tear), there are cases in which light beams emitted from a reflection-type light source enter a light guide (horn-shaped light guide) that is disposed on an opposite side to the original and are re-reflected, and thereafter the light beams are emitted again and enter a light receiving element. Further, a similar situation arises when light beams are transmitted through a watermark portion when reading the watermark portion. The stray light (reflection light that is described later) becomes a noise component in the output of the image sensor unit, and a difference between an output signal (signal component) when an original is present and the noise component produced by the stray light decreases, and this leads to problems such as the contrast becoming blurred and a decrease in the accuracy of a read image.

SUMMARY OF THE INVENTION

The present invention has been made in view of the above described situation, and an object of the present invention is to provide an image sensor unit and an image reading apparatus that can improve the accuracy of a read image by reducing the influence of stray light.

To achieve the above object, an image sensor unit according to the present invention is an image sensor unit that performs image reading by reflected light and image reading by transmitted light with respect to an object of illumination, comprising: a first light guide that emits light from a first light source toward the object of illumination; a second light guide that emits light from a second light source toward the object of illumination; an imaging element that focuses light from the object of illumination; and a light receiving element that converts light that is collected by the imaging element into an electric signal, wherein the second light source and the second light guide are disposed on opposite sides of a conveyance path through which the object of illumination can pass, and light blocking means that blocks at least a part of light from the first light guide is disposed between the first light guide and the second light guide.

Further, in the image sensor unit according to the present invention, the light blocking means is disposed on a side of one of the first light guide and the second light guide, and has a slit of a predetermined width.

Further, in the image sensor unit according to the present invention, the light blocking means is constituted by an optical film that is disposed on an emission surface side of the second light guide.

Further, in the image sensor unit according to the present invention, an emission wavelength of the first light source and an emission wavelength of the second light source are different, and the light blocking means is constituted by an optical filter that is disposed on the emission surface side of the second light guide.

Further, in the image sensor unit according to the present invention, an emission surface of the second light guide is narrower than other areas thereof in a sub-scan direction.

Further, an image reading apparatus according to the present invention is an image reading apparatus that, while causing any of the above described image sensor units and the object of illumination to move with respect to each other, reads an image from the object of illumination by means of the image sensor unit.

BRIEF DESCRIPTION OF THE DRAWINGS

FIG. 14A is a schematic view illustrating an example in which an optical filter (a cover glass with a germanium layer affixed thereon) that absorbs visible light as a light blocking member and white reference members are used in combination in the image sensor unit according to the present invention;

FIG. 14B is a schematic view illustrating a different example in which an optical filter (a cover glass with a germanium layer affixed thereon) that absorbs visible light as a light blocking member and white reference members are used in combination in the image sensor unit according to the present invention;

DETAILED DESCRIPTION OF THE PREFERRED EMBODIMENTS

In the following, image sensor units and image reading apparatuses according to preferred embodiments of the present invention will be described with reference to the drawings.

Figure 1:
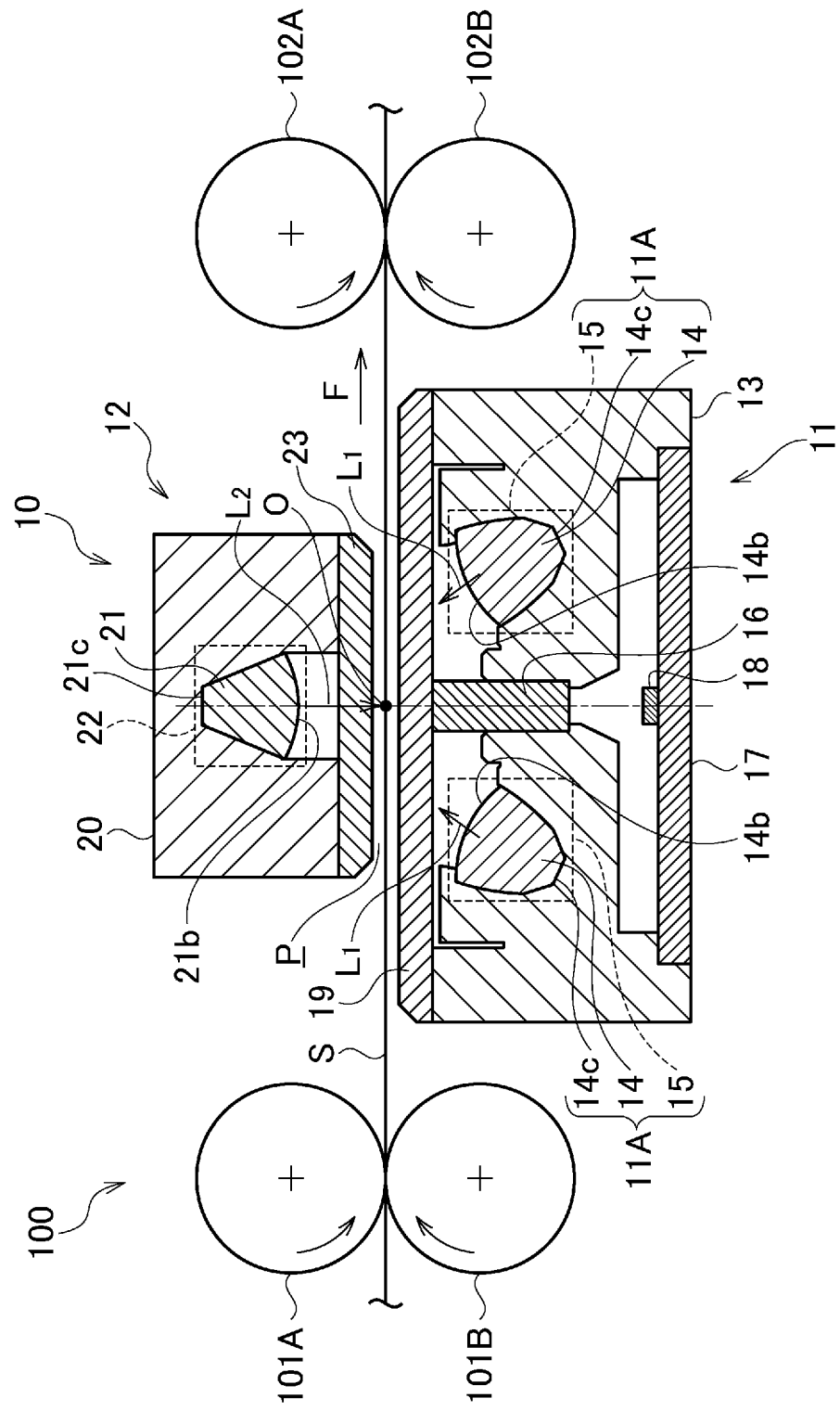
FIG. 1 is a schematic view illustrating a section of an image reading apparatus provided with an image sensor unit according to the present invention.

FIG. 1 illustrates a configuration of essential parts of an image reading apparatus 100 provided with an image sensor unit 10 according to the present embodiment. First, the entire configuration will be schematically described.

The image reading apparatus 100 functions as a paper sheet identification apparatus that authenticates a recording medium, such as a bill, security and so on. In this embodiment, a bill S will be described as a typical example of an object of illumination. However, the present invention can also be applied to other objects than the bill S.

In the image reading apparatus 100, a pair of conveyor rollers 101A and 101B and a pair of conveyor rollers 102A and 102B for conveying the bill S held therebetween are disposed at predetermined positions at a predetermined distance in a conveyance direction F of the bill S. The conveyor rollers 101A, 101B, 102A and 102B are designed to be rotated by a driving mechanism to convey the bill S to the image sensor unit 10 at a predetermined conveyance speed in the conveyance direction F, causing the bill S and the image sensor unit 10 to move with respect to each other.

As shown in the drawing, the image sensor unit 10 is disposed between the pair of conveyor rollers 101A and 101B and the pair of conveyor rollers 102A and 102B on a conveyance path P through which the bill S can pass. The image sensor unit 10 is disposed so as to sandwich the conveyance path P from the top and bottom, and reads an image on the bill S that is conveyed. In this embodiment, the image sensor unit 10 has an image reading portion 11 for reading an image that includes a reflection reading illumination portion 11A that emits light for reflection reading to the bill S and a transmission reading illumination portion 12 that emits light for transmission reading to the bill S. Image reading by reflected light and image reading by transmitted light can be performed with respect to the bill S by the image reading portion 11 reading light from the image reading portion 11 (reflection reading illumination portion 11A) and the transmission reading illumination portion 12, respectively.

The image reading portion 11 includes, in a frame 13 that is a member forming a housing, the reflection reading illumination portion 11A that comprises a reflection reading light guide 14 (first light guide) for guiding light from a reflection reading light source 15 (first light source) that is schematically illustrated in FIG. 1 to a reading position (reading line) O on one surface (lower surface) of the bill S, and a reflection reading light source 15 (see FIG. 2) that is disposed at an end in the longitudinal direction of the reflection reading light guide 14. The image reading portion 11 also includes a rod-lens array 16 that serves as an imaging element that focuses reflected light (including also a case of transmitted light that is described later) from the bill S on a light receiving element 18 that is described hereafter, the light receiving element 18 that is disposed and fixed on a sensor substrate 17, and a transparent cover glass 19 that covers an upper portion of the frame 13.

Figure 2:
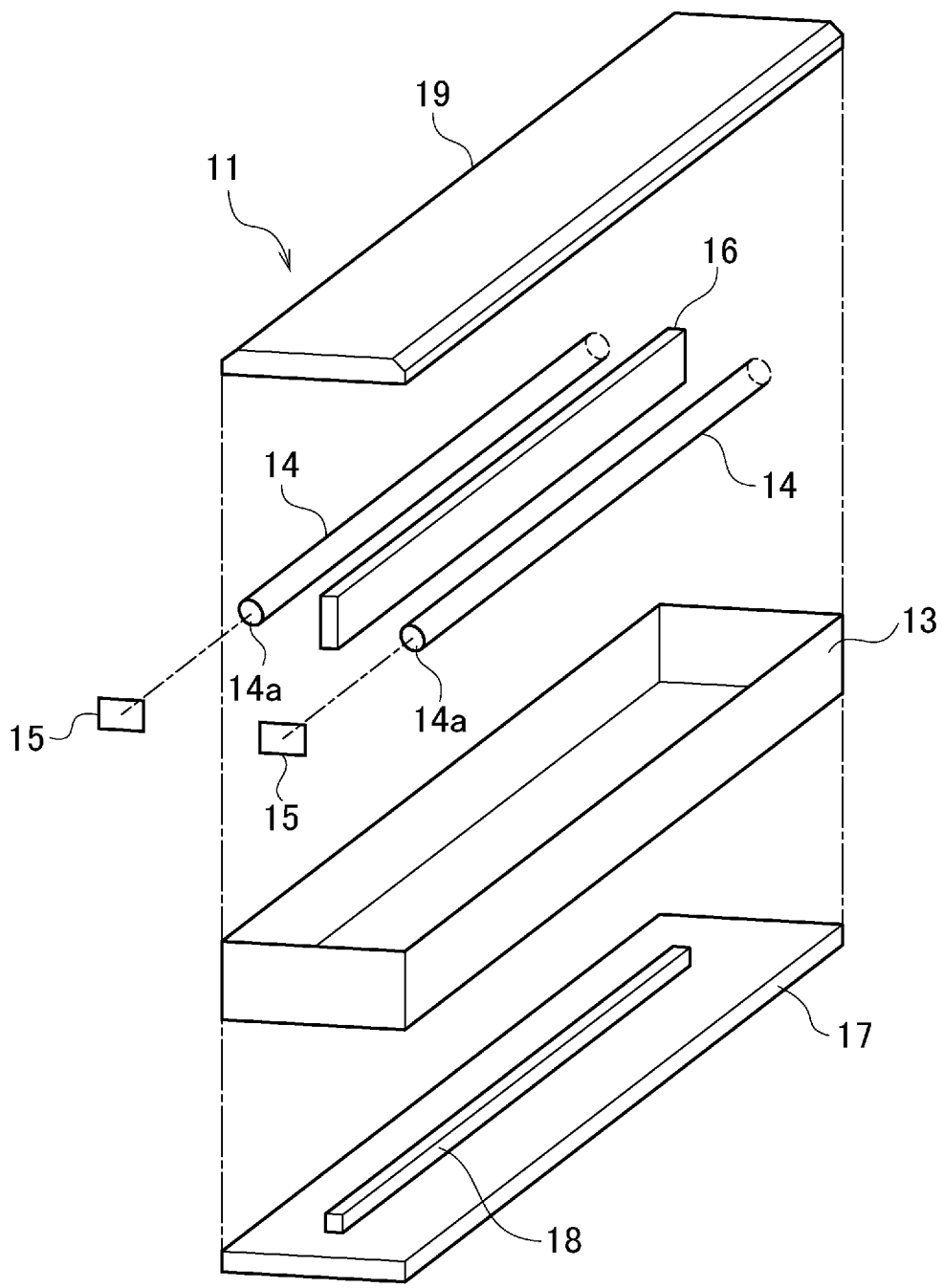
FIG. 2 is a schematic exploded view illustrating a configuration example of an image reading portion in the image sensor unit according to the present invention.

The frame 13 is typically formed in a substantially rod shape using a resin material. The direction that is perpendicular to the page surface in FIG. 1 is the longitudinal direction (main-scan direction) of the frame 13. FIG. 2 illustrates a configuration of essential parts of the image reading portion 11 in which each member, including the frame 13, is elongated in the main-scan direction. In FIG. 2, an area that is capable of housing the reflection reading light guide 14, the rod-lens array 16, the substrate 17, and the reflection reading light source 15 by fitting or the like is formed inside the frame 13, although the detailed structure and shape of the frame 13 and the like are omitted from the drawing.

The reflection reading light guide 14 is made of a transparent material, such as an acrylic resin or polycarbonate. In this example, a pair of reflection reading light guides 14 are disposed on the opposite sides of the optical axis of the rod-lens array 16. In each reflection reading light guide 14, an end face on one side in the longitudinal direction thereof is formed as a light entering surface 14a which the light from the reflection reading light source 15 enters, a top surface thereof is formed as a reflected light emission surface 14b from which the light that has propagated through the interior of the reflection reading light guide 14 is emitted, and a surface facing the reflected light emission surface 14b is formed as a diffusing surface 14c. Light that is representatively shown in FIG. 1 is emitted toward the reading position O of the bill S as shown by an arrow $L_1$.

In this case, in a state in which the reflection reading light guides 14 are mounted to the frame 13 as shown in FIG. 1, with the surface on the bill S side serving as the reflected light emission surface 14b, the reflection reading light guides 14 are exposed from the frame 13 and formed in a convex shape toward the bill S side so as to have a light collecting effect at the reflected light emission surface 14b. The other surfaces than the light entering surface 14a, the reflected light emission surface 14b and the diffusing surface 14c are substantially formed as reflection surfaces. Light that is incident from the light entering surface 14a is reflected and diffused within the reflection reading light guide 14. More specifically, the incident light propagates through the inside of the reflection reading light guide 14 while being subjected to total reflection by the reflection surface thereof, is emitted from the reflected light emission surface 14b, and irradiated in a substantially uniform manner as a line of light in the main-scan direction toward the bill S.

A reflection reading light source 15 is disposed on the light entering surface 14a. Although in the example illustrated in FIG. 2, the reflection reading light source 15 is disposed on an end face on one side of the reflection reading light guide 14, the reflection reading light source 15 may be provided on end faces on both sides of the reflection reading light guide 14. For example, light emitting elements that comprise LEDs having emission wavelengths of the three colors of red, green and blue (abbreviated as RGB hereinafter), and also light emitting elements that comprise LEDs that emit infrared light (abbreviated as IR hereinafter) and ultraviolet light (abbreviated as UV hereinafter) are provided as the reflection reading light source 15.

The rod-lens array 16 comprises a plurality of rod-lenses of an erect equal magnification imaging type linearly arranged in the main-scan direction, for example, and has a light entering surface for light on the bill S side and an emission surface for light on the light receiving element 18 side. Thus, the pair of reflection reading light guides 14 are spaced apart from each other in the sub-scan direction, and the rod-lens array 16 is disposed at a center position therebetween. The imaging element is not limited to the rod-lens array 16 but may be a micro-lens array, for example.

The light receiving element 18 is disposed so as to be substantially aligned with the optical axis of the rod-lens array 16, and includes a photoelectric conversion element that converts reflected light (also including a case of transmitted light as described later) from the bill S into an electric signal.

In a basic operation of the image reading portion 11 configured as described above, the RGB, IR and UV light emitting elements of each reflection reading light source 15 are successively activated to make them emit light to the bill S conveyed by the conveyor rollers 101A, 101B, 102A and 102B in the conveyance direction F at a predetermined conveyance speed. The light emitted from the reflection reading light source 15 propagates through the reflection reading light guide 14 and is uniformly illuminated as a line of light in the main-scan direction toward the reading position O on the surface of the bill S from the two directions on the opposite sides of the rod-lens array 16. The illumination light is reflected by the bill S and then focused through the rod-lens array 16 to form an image on the light receiving element 18. The reflected light focused to form an image is converted into an electric signal by the light receiving element 18, and the electric signal is processed by a signal processing portion.

The operation of reading the bill S along one scan line in the main-scan direction is completed by reading all of the RGB, IR and UV reflected light for one scan line as described above. When the reading operation for one scan line is completed, the bill S is moved in the sub-scan direction, and a reading operation for the next one scan line is performed in a similar manner to the above described operation. The reading operation for one scan line is repeated while conveying the bill S in the conveyance direction F, thereby sequentially scanning the whole surface of the bill S to achieve reading of the image with the reflected light.

The transmission reading illumination portion 12 includes, in a frame 20 that is a member forming a housing, a transmission reading light guide (second light guide) for guiding light from a transmission reading light source 22 (second light source) that is schematically illustrated in FIG. 1 to a reading position (reading line) O on the other surface (upper surface) of the bill S, the transmission reading light source 22 that is disposed at a longitudinal direction end of the transmission reading light guide 21, and a transparent cover glass 23 that covers a lower portion of the frame 20. With the transmission reading illumination portion 12, the light that is irradiated at the bill S is transmitted through the bill S and is focused on the light receiving element 18 on the sensor substrate 17 by the rod-lens array 16 provided in the image reading portion 11.

Figure 3:
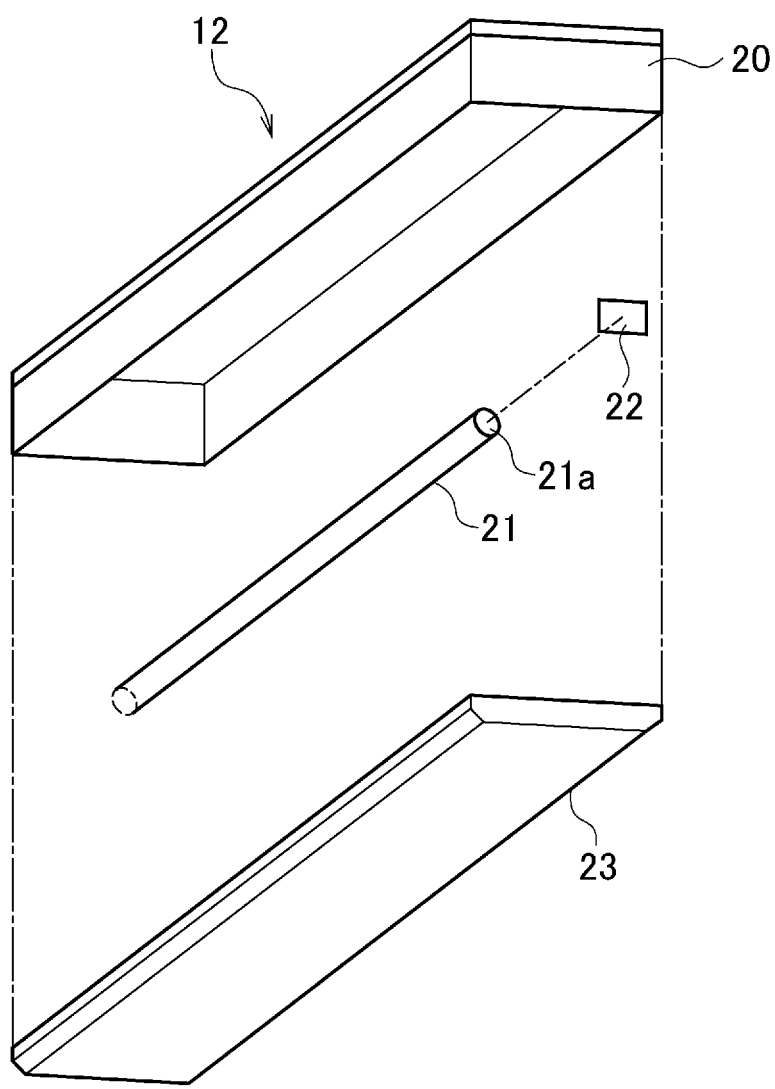
FIG. 3 is a schematic exploded view illustrating a configuration example of a transmission reading illumination portion in the image sensor unit according to the present invention.

The frame 20 is typically formed in a substantially rod shape using a resin material. The direction that is perpendicular to the page surface in FIG. 1 is the longitudinal direction (main-scan direction) of the frame 20. FIG. 3 illustrates a configuration of essential parts of the transmission reading illumination portion 12 in which each member, including the frame 20, is elongated in the main-scan direction. In FIG. 3, an area that is capable of housing the transmission reading light guide 21 and the transmission reading light source 22 by fitting or the like is formed inside the frame 20, although the detailed structure and shape of the frame 20 is omitted from the drawing.

The transmission reading light guide 21 is made of a transparent material, such as an acrylic resin or polycarbonate. In this example, a single transmission reading light guide 21 is disposed on the opposite side to the light receiving element 18 so that the transmission reading light guide 21 and the light receiving element 18 are above and below the bill S, respectively, on the optical axis of the rod-lens array 16. In the transmission reading light guide 21, an end face on one side in the longitudinal direction thereof is formed as a light entering surface 21a which the light from the reflection reading light source 15 enters, a bottom surface thereof is formed as a transmitted light emission surface 21b from which light that has propagated through the interior of the transmission reading light guide 21 is emitted, and a surface facing the transmitted light emission surface 21b is formed as a diffusing surface 21c. Light that is representatively shown in FIG. 1 is emitted toward the reading position O of the bill S from an orthogonal direction as shown by an arrow $L_2$.

In this case, in a state in which the transmission reading light guide 21 is mounted to the frame 20 as shown in FIG. 1, with the surface on the bill S side serving as the transmitted light emission surface 21b, the transmission reading light guide 21 is exposed from the frame 20 and formed in a convex shape toward the bill S side so as to have a light collecting effect at the transmitted light emission surface 21b. The other surfaces than the light entering surface 21a and the transmitted light emission surface 21b are substantially formed as reflection surfaces. Light that is incident from the light entering surface 21a is reflected and diffused within the transmission reading light guide 21. More specifically, the incident light propagates through the inside of the transmission reading light guide 21 while being subjected to total reflection by the reflection surface thereof, is emitted from the transmitted light emission surface 21b, and irradiated in a substantially uniform manner as a line of light in the main-scan direction toward the bill S.

A transmission reading light source 22 is disposed on the light entering surface 21a. Although in the example illustrated in FIG. 3 the transmission reading light source 22 is disposed on an end face on one side of the transmission reading light guide 21, the transmission reading light source 22 may be provided on end faces on both sides of the transmission reading light guide 21. For example, light emitting elements that comprise LEDs having emission wavelengths of the three colors of RGB and light emitting elements that comprise LEDs that emit IR and UV light are provided as the transmission reading light source 22.

In a basic operation of the transmission reading illumination portion 12 configured as described above, the RGB, IR and UV light emitting elements of the transmission reading light source 22 are successively activated to make them emit light to the bill S conveyed by the conveyor rollers 101A, 101B, 102A and 102B in the conveyance direction F at a predetermined conveyance speed. The light emitted from the transmission reading light source 22 propagates through the transmission reading light guide 21 and is uniformly irradiated as a line of light in the main-scan direction toward the reading position O on the surface of the bill S. The illumination light is transmitted through the bill S and then focused through the rod-lens array 16 to form an image on the photoelectric conversion element of the light receiving element 18. The transmitted light focused to form an image is converted into an electric signal (output signal) by the light receiving element 18, and the electric signal is processed by the signal processing portion. When reading an image by means of transmitted light also, the operation of reading the bill S along one scan line in the main-scan direction is completed by reading all of the RGB, IR and UV transmitted light for one scan line as described above. When the reading operation for one scan line is completed, the bill S is moved in the sub-scan direction, and a reading operation for the next one scan line is performed in a similar manner to the above described operation. The reading operation for one scan line is repeated while conveying the bill S in the conveyance direction F, thereby sequentially scanning the whole surface of the bill S to achieve reading of the image with the transmitted light.

In this connection, there are cases in which the light from the image reading portion 11 is directly incident on the transmission reading light guide 21 of the transmission reading illumination portion 12, and thereafter the light is emitted again to rod-lens array 16. Such cases occur, for example, when there is a gap between respective bills S when the bills S are being read consecutively, when reading a damaged portion such as a rip or a tear, or when reading a watermark portion or the like. In such cases, so-called "reflection light" that includes the relevant stray light and the like becomes a noise component in the output of the image sensor unit 10, and a difference between an output signal (signal component) when the bill S is present and the noise component produced by the stray light decreases, and if no countermeasure is taken, a problem may arise whereby the contrast becomes blurred and the accuracy of a read image decreases or the like.

The image sensor unit 10 of the present invention has the image reading portion 11 and the transmission reading illumination portion 12, and is configured to combine the use of transmission type and reflection type reading. In particular, according to the present invention, as shown in FIG. 4, a light blocking member 1 as light blocking means that blocks a part of light (L arrows in FIG. 4) that is irradiated to the transmission reading illumination portion 12 side from the image reading portion 11 is disposed between the reflection reading light guides 14 of the image reading portion 11 and the transmission reading light guide 21 of the transmission reading illumination portion 12.

According to this embodiment, in particular, the light blocking member 1 is constituted by a light blocking cover or a light blocking sheet 1A that is disposed on the transmitted light emission surface 21b side of the transmission reading light guide 21 of the transmission reading illumination portion 12. The light blocking sheet 1A has a slit 2 that is formed in the main-scan direction. The slit 2 has a predetermined opening width W in the sub-scan direction.

A part of the frame 13 of the image reading portion 11 can be formed as the light blocking sheet 1A, or the light blocking sheet 1A may be formed by providing a cover member that is a separate element as an accessory. Further, the light blocking sheet 1A may be a component to which a sheet member that is a separate element is affixed, or may be integrated with the cover glass 23. In each case, it is desirable that a surface on the image reading portion 11 side of the light blocking sheet 1A has a light absorption characteristic and the other surface on the transmission reading illumination portion 12 side thereof has a light reflection characteristic.

Figure 4:
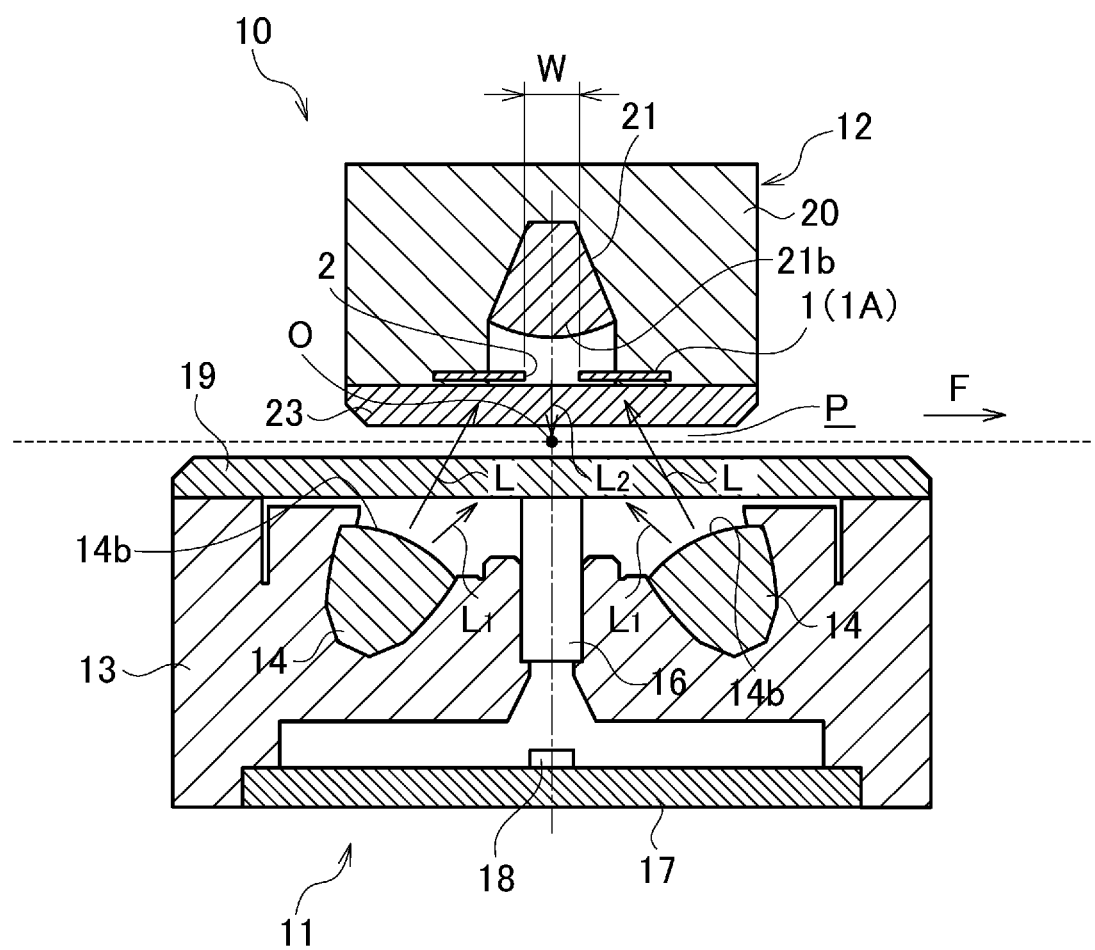
FIG. 4 is a schematic view illustrating a section of an example in which a light blocking sheet is provided as a light blocking member in the image sensor unit according to the present invention.

In the image sensor unit 10 according to the present invention, by providing the light blocking sheet 1A as the light blocking member 1 between the reflection reading light guides 14 of the image reading portion 11 and the transmission reading light guide 21 of the transmission reading illumination portion 12, in particular, light beams that attempt to enter the transmission reading light guide 21 of the transmission reading illumination portion 12 from the image reading portion 11 side when performing a reading operation by means of the image reading portion 11 can be effectively blocked as shown in FIG. 4. In this case, in a state where there is no bill S on the conveyance path P formed between the image reading portion 11 and the transmission reading illumination portion 12 and/or in a state of performing reading by means of the image reading portion 11 with respect to a watermark portion or the like, the light blocking sheet 1A is particularly effective, and a noise component in an output signal of the image sensor unit 10 that is ascribable to reflection light can be suppressed to a low level.

Figure 5A:
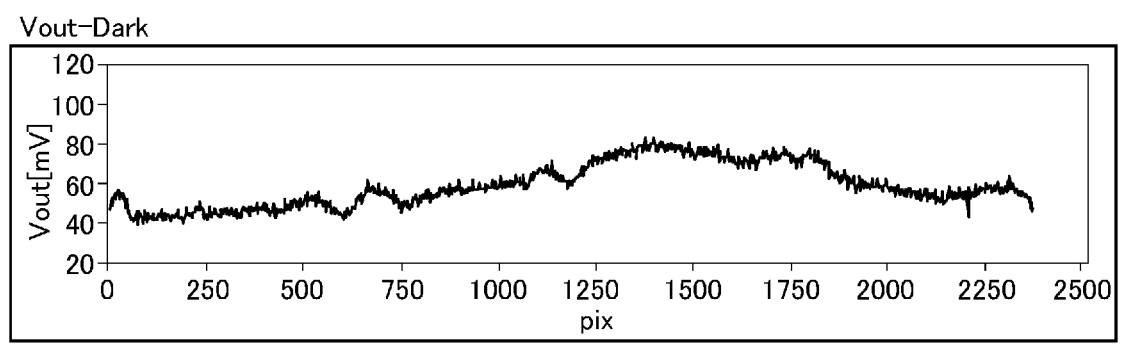
FIG. 5A is a view illustrating an example of an output signal of the image sensor unit in a case where a light blocking member is provided in the image sensor unit according to the present invention.
Figure 5B:
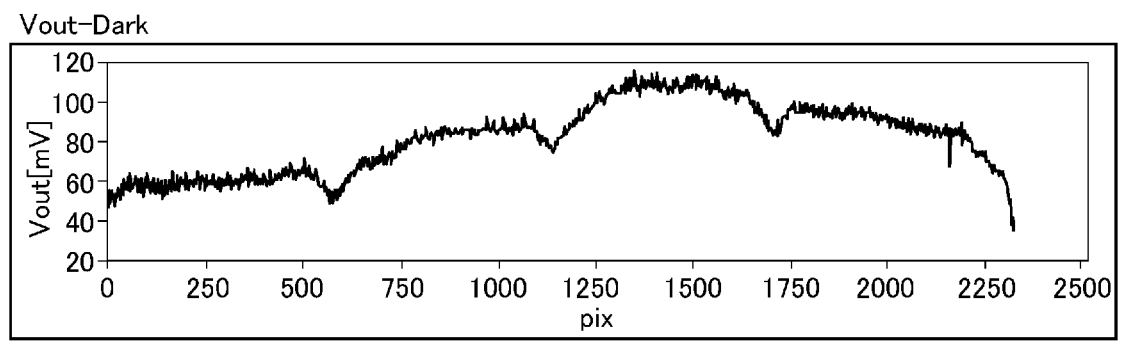
FIG. 5B is a view illustrating an example of an output signal of the image sensor unit in a case where a light blocking member is not provided.

FIG. 5A shows an output signal of the image sensor unit 10, more specifically, of the light receiving element 18 of the image reading portion 11, in a case where the light blocking member 1 is provided according to the present invention, and FIG. 5B shows, as a comparison example, an output signal of the image sensor unit 10 in a case where the light blocking member 1 is not provided. In a case in which the light blocking member 1, in this example the light blocking sheet 1A, is not provided, in a state in which the bill S is not present on the conveyance path P and/or in a state in which reading is performed by the image reading portion 11 with respect to a watermark portion or the like, light that is emitted from the reflection reading light guides 14 of the image reading portion 11 becomes reflection light and reaches the transmission reading light guide 21 of the transmission reading illumination portion 12, and passes along the light transmission path (arrow $L_2$) as it is and is received by the light receiving element 18. Consequently, the output signal of the image sensor unit 10 increases significantly as shown in FIG. 5B. In this case, when reading the bill S or the like, it is desirable that the background of the bill S in the image that is read is black, to enable edge detection of the bill S to be effectively performed. When reflection light is received at a portion that corresponds to the background, the contrast between the bill S and the background decreases, and if a countermeasure is not implemented, the detection accuracy or image quality decreases. According to the present invention, the S/N ratio can be improved by effectively blocking such kind of reflection light, and thus a high quality image can be obtained. In this connection, although ideally it is desirable that the output signal is made 0 in a state in which there is no bill S on the conveyance path P, in actuality it is difficult to make the output signal completely 0. According to the present invention, under such circumstances the influence of reflection light can be eliminated in a manner that is close to the ideal situation.

Figure 6:
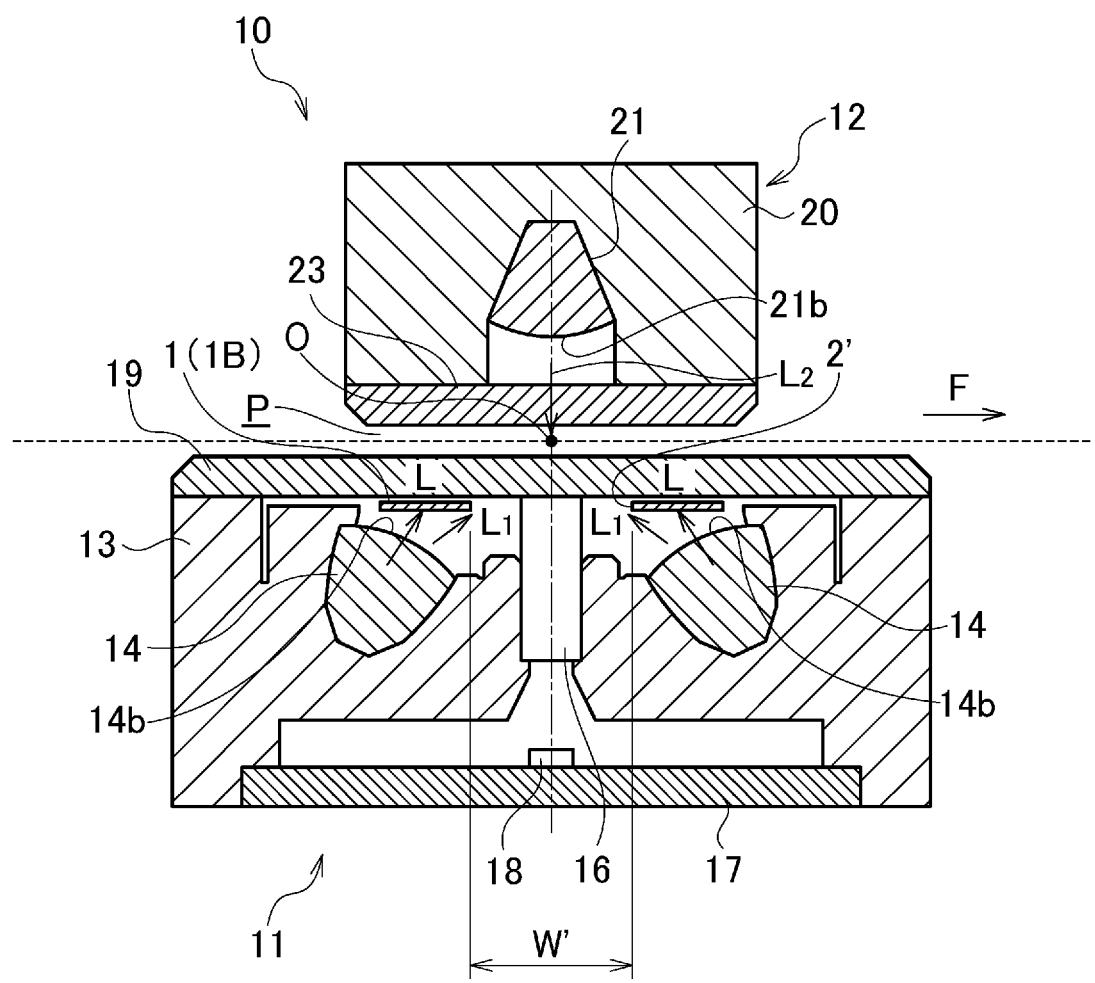
FIG. 6 is a schematic view illustrating a section of a different example in which a light blocking sheet is provided as a light blocking member in the image sensor unit according to the present invention.

Further, as shown in FIG. 6, it is also possible to dispose the light blocking member 1 on the side of the reflected light emission surfaces 14b of the reflection reading light guides 14 of the image reading portion 11. The light blocking member 1 is constituted by a light blocking cover or a light blocking sheet 1B, and a slit 2' of the light blocking sheet 1B has a predetermined opening width W' in the sub-scan direction.

A part of the frame 20 of the transmission reading illumination portion 12 can be formed as the light blocking sheet 1B, or the light blocking sheet 1B can be formed by providing a cover member that is a separate element as an accessory. Further, the light blocking sheet 1B may be a component to which a sheet member that is a separate element is affixed, or may be integrated with the cover glass 19. In each case, it is desirable that a surface on the image reading portion 11 side of the light blocking sheet 1B has a light absorption characteristic and the other surface on the transmission reading illumination portion 12 side thereof has a light reflection characteristic.

In the image sensor unit 10 according to the present invention, by providing the light blocking sheet 1B as the light blocking member 1 between the reflection reading light guides 14 of the image reading portion 11 and the transmission reading light guide 21 of the transmission reading illumination portion 12, in particular, light beams (L arrows in FIG. 6) that attempt to enter the transmission reading light guide 21 of the transmission reading illumination portion 12 from the image reading portion 11 side when performing a reading operation by means of the image reading portion 11 can be effectively blocked. Accordingly, in this case also, reflection light can be prevented from reaching the transmission reading light guide 21 of the transmission reading illumination portion 12. Further, this configuration has the same actions and effects as the case of the light blocking sheet 1A.

Even when the light blocking sheet 1A and the light blocking sheet 1B are used individually as in the above described examples, they each have an excellent light blocking effect. It is also possible to use the light blocking sheet 1A and the light blocking sheet 1B in combination.

Figure 7:
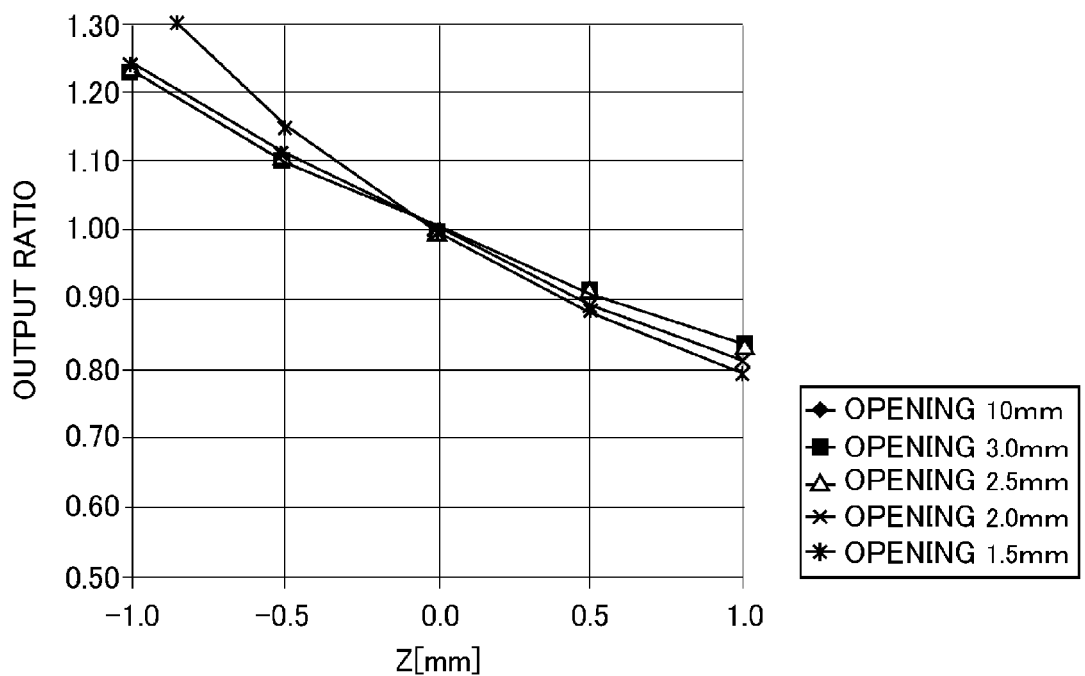
FIG. 7 is a view showing simulation results with respect to illumination depth characteristics of a transmission reading light source in the image sensor unit according to the present invention.

Simulation results will now be described with respect to illumination depth characteristics of a reflection reading light source and a transmission reading light source of the image reading portion 11 and the transmission reading illumination portion 12, respectively. For example, FIG. 7 shows simulation results with respect to illumination depth characteristics of the transmission reading light source, in which the relation between the illumination depth (horizontal axis z in FIG. 7) and the relative illuminance (vertical axis in FIG. 7) is shown for a case in which the opening width W of the slit 2 of the light blocking sheet 1A (see FIG. 4) is varied. In this case, the opening width W is varied within the range of 1.5 mm to 10.0 mm. In this connection, the term "illumination depth z (mm)" refers to, specifically, that a gap between the cover glass 23 of the transmission reading light source and the cover glass 19 of the reflection reading light source is 2 mm and a focal point (focus) is at a center part thereof. As described above, although the light blocking sheet 1A exhibits an excellent function with respect to an action to prevent infiltration of reflection light, if the opening width W is narrowed excessively to around 1.5 mm, the illuminance is insufficient. Accordingly, it is preferable that the opening width W of the slit 2 of the light blocking sheet 1A is at least 2 mm or more.

Figure 8:
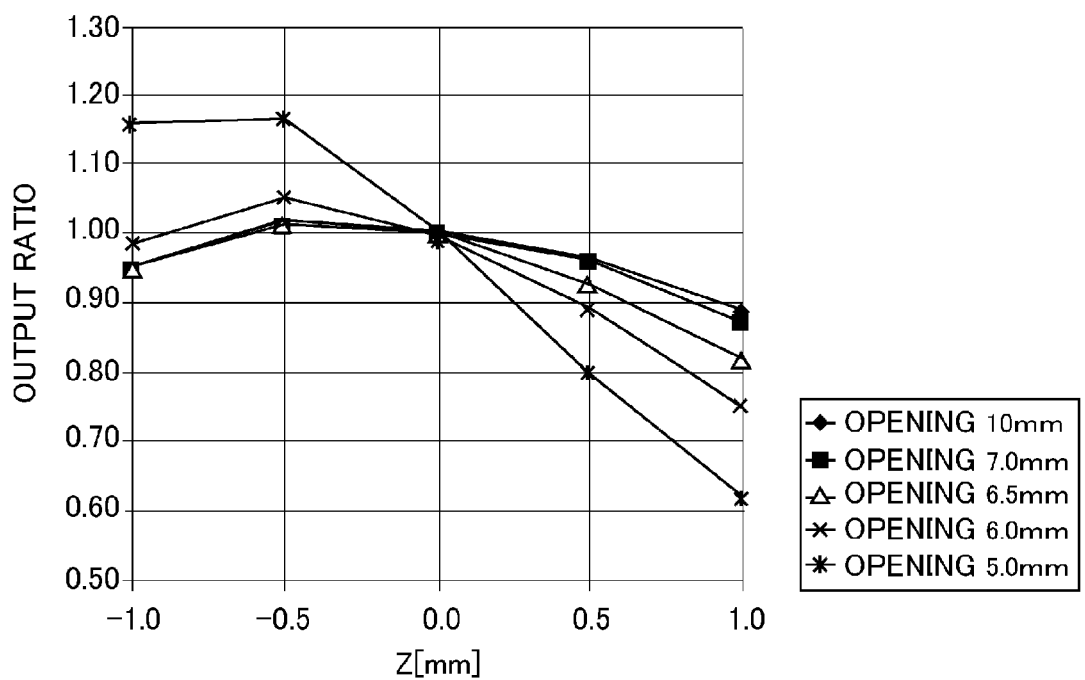
FIG. 8 is a view showing simulation results with respect to illumination depth characteristics of a reflection reading light source in the image sensor unit according to the present invention.

Similarly, FIG. 8 shows, with respect to illumination depth characteristics of the reflection reading light source, simulation results for the relation between the illumination depth and the relative illuminance when the opening width W' of the slit 2' of the light blocking sheet 1B (see FIG. 6) is varied. In this case, the opening width W' is varied within the range of 5.0 mm to 10.0 mm. Although the light blocking sheet 1B also exhibits an excellent function with respect to preventing infiltration of reflection, if the opening width W' thereof is narrowed excessively to around 6.0 mm, the illuminance is insufficient. Accordingly, it is preferable that the opening width W' of the slit 2' of the light blocking sheet 1B is at least 6.5 mm or more.

Figure 9:
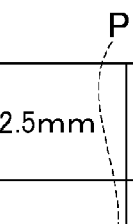
FIG. 9 is a view showing simulation results with respect to the relation between opening widths of a slit of a light blocking sheet and reflection light in the image sensor unit according to the present invention.

Further, FIG. 9 shows simulation results with respect to the relation between the opening widths W and W' of the slits 2 and 2' of the light blocking sheet 1A and the light blocking sheet 1B and reflection light. In this case, light amounts that are incident on the transmission reading light source are compared for a case where the opening width W of the slit 2 of the light blocking sheet 1A on the transmission reading illumination portion 12 side (transmission) is varied within the range of 1.5 mm to 3.0 mm and the opening width W' of the slit 2' of the light blocking sheet 1B on the image reading portion 11 side (reflection) is varied within the range of 6.0 mm to 7.5 mm. The amount of reflection light when neither of the light blocking sheet 1A and the light blocking sheet 1B is provided is taken as a reference value 1.00, and the respective proportions with respect to the reference value are shown.

As shown in FIG. 9, a range P in which the opening width W of the slit 2 of the light blocking sheet 1A is between 2.0 mm and 3.0 mm and the opening width W' of the slit 2' of the light blocking sheet 1B is between 6.5 mm and 7.5 mm is appropriate to effectively decrease the reflection light. In the range P, in particular, a configuration in which the opening width W of the slit 2 of the light blocking sheet 1A is equal to 2.5 mm and the opening width W' of the slit 2' of the light blocking sheet 1B is equal to 7.0 mm is optimal.

Figure 10:
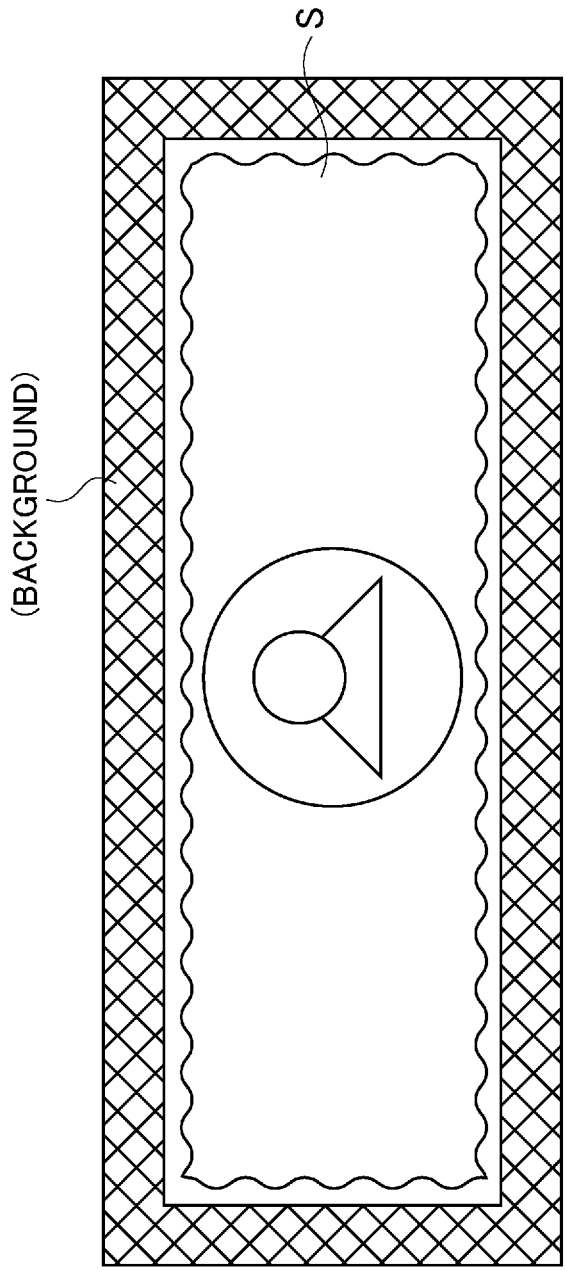
FIG. 10 is a view illustrating an example of an image that is obtained when reflection reading is carried out with respect to a bill in the image sensor unit according to the present invention.

FIG. 10 illustrates an example of an image that is obtained when reflection reading is performed with respect to the bill S in the image reading portion 11 of the image reading apparatus 100 that is provided with the image sensor unit 10 of the present invention. As described above, it is desirable that the background of the bill S or the like in a read image of the bill S or the like is black, to enable edge detection of the bill S to be effectively performed. According to the present invention, by effectively blocking reflection light to reduce the influence thereof, the contrast between the bill S and the background is sharpened, and high detection accuracy can be ensured.

Figure 11:
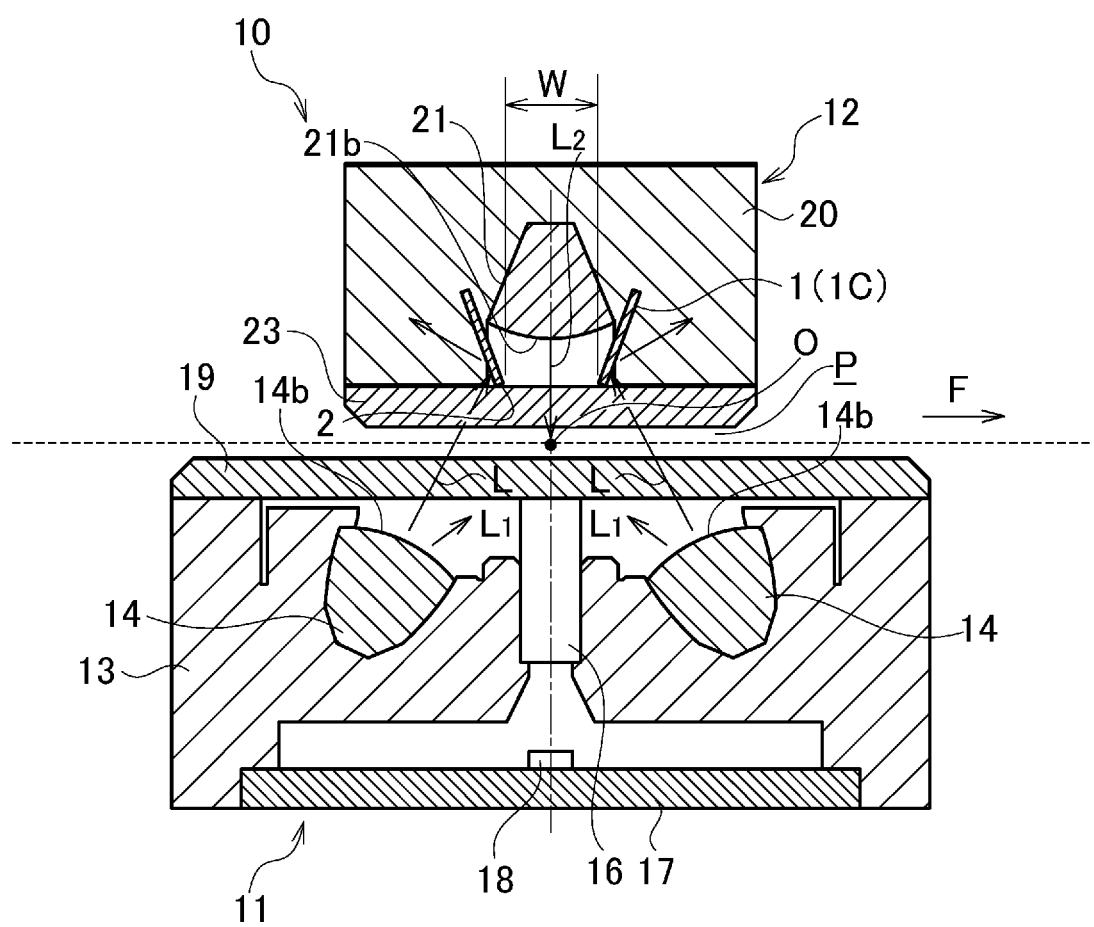
FIG. 11 is a schematic view illustrating a section of another different example in which a light blocking sheet is provided as a light blocking member in the image sensor unit according to the present invention.

FIG. 11 illustrates a different example in which the light blocking member 1 is disposed between the reflection reading light guides 14 of the image reading portion 11 and the transmission reading light guide 21 of the transmission reading illumination portion 12. In this connection, in the following description, as appropriate, the same symbols are used for the same or corresponding members.

In this example, in the transmission reading illumination portion 12, the light blocking member 1 is constituted by a light blocking sheet 1C that is disposed in an inclined manner so as to sandwich the transmission reading light guide 21 from both sides. The light blocking sheet 1C has a slit 2 formed in the main-scan direction, and the slit 2 has a predetermined opening width W in the sub-scan direction.

In this example, particularly in a state in which the bill S is not present on the conveyance path P at a time of reading by the image reading portion 11 and/or in a state in which a watermark portion is read by the image reading portion 11, light beams (L arrows in FIG. 11) that attempt to enter the transmission reading light guide 21 of the transmission reading illumination portion 12 from the image reading portion 11 side are reflected by the light blocking sheet 1C, and can thus be effectively blocked. In this connection, light that is incident on the transmission reading light guide 21 from the transmission reading light source 22 in the transmission reading illumination portion 12 is irradiated toward the bill S as shown by an arrow $L_2$ in FIG. 11.

Figure 12:
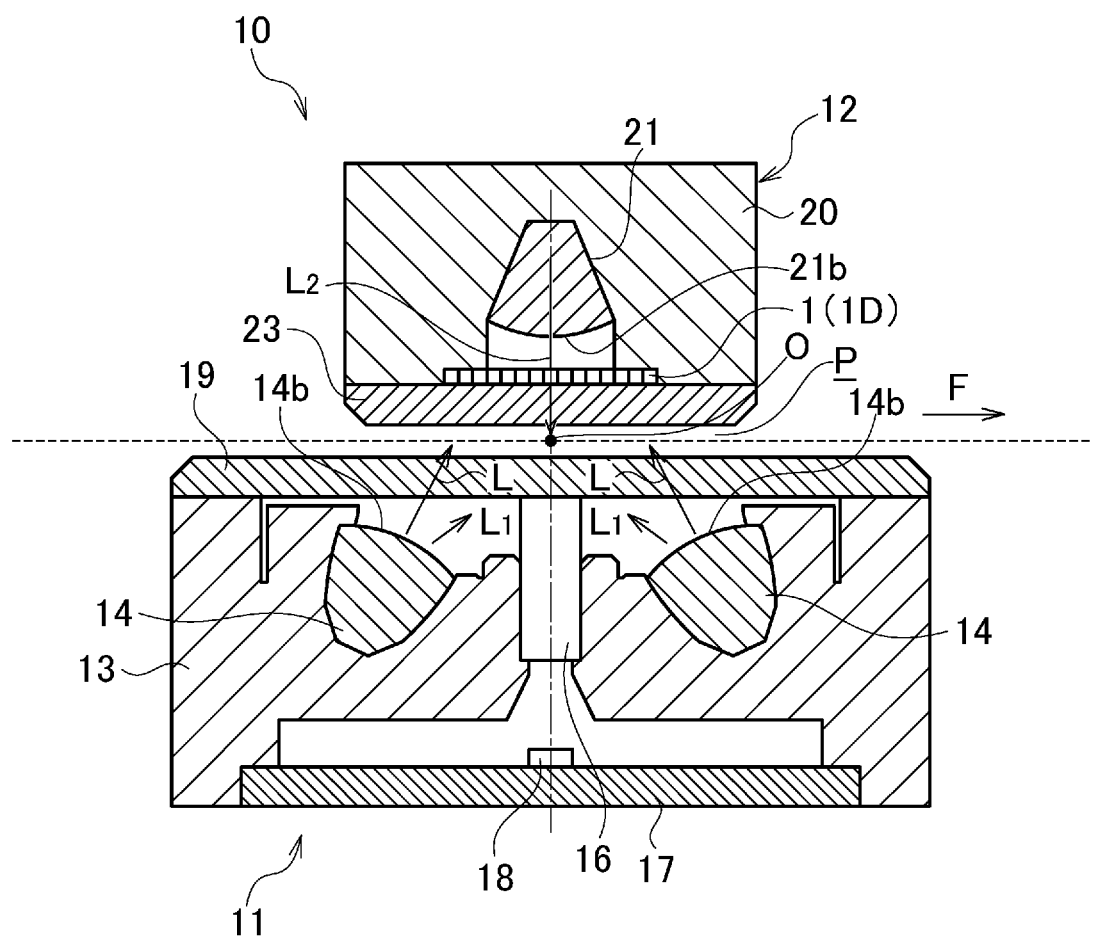
FIG. 12 is a schematic view illustrating a section of an example in which a louver film is provided as a light blocking member in the image sensor unit according to the present invention.

FIG. 12 illustrates another different example of the light blocking member 1 that is disposed between the reflection reading light guides 14 of the image reading portion 11 and the transmission reading light guide 21 of the transmission reading illumination portion 12.

In this example, in the transmission reading illumination portion 12, the light blocking member 1 is constituted, for example, by a louver film 1D that is affixed to the cover glass 23. The louvers of the louver film 1D are formed so as to be oriented in the optical axis direction of the rod-lens array 16.

In this example, particularly in a state in which the bill S is not present on the conveyance path P at a time of reading by the image reading portion 11 and/or in a state in which a watermark portion is read by the image reading portion 11 or the like, light beams (L arrows in FIG. 12) that attempt to enter the transmission reading light guide 21 of the transmission reading illumination portion 12 from the image reading portion 11 side are effectively blocked by the louver film 1D. In this connection, light that is incident on the transmission reading light guide 21 from the transmission reading light source 22 in the transmission reading illumination portion 12 is irradiated toward the bill S as shown by an arrow $L_2$ in FIG. 12. The light can pass between the louvers of the louver film 1D and reach the bill S.

The louver film 1D may be formed by alternately disposing light transmitting layers and light blocking layers, or may be a structure in which light blocking plates are provided in a blind shape.

In addition to the examples described above, for example, it is also possible to affix onto the cover glass 23 an optical film in which the vicinity of the optical axis of the rod-lens array 16 is flat and areas on the outer sides of the flat portion are arranged in the shape of a Fresnel lens that is formed in a saw-tooth shape in the sub-scan direction.

According to this optical film, light beams that attempt to enter the transmission reading light guide 21 of the transmission reading illumination portion 12 from the image reading portion 11 side can be effectively blocked at the Fresnel lens portion.

Furthermore, it is also possible to dispose a polarizing filter on the side of the reflected light emission surfaces 14b of the reflection reading light guides 14 and the side of the transmitted light emission surface 21b of the transmission reading light guide 21, respectively. In this case, light beams that attempt to enter the transmission reading light guide 21 of the transmission reading illumination portion 12 from the image reading portion 11 side can be effectively blocked by making the polarizing angles orthogonal.

Figure 13:
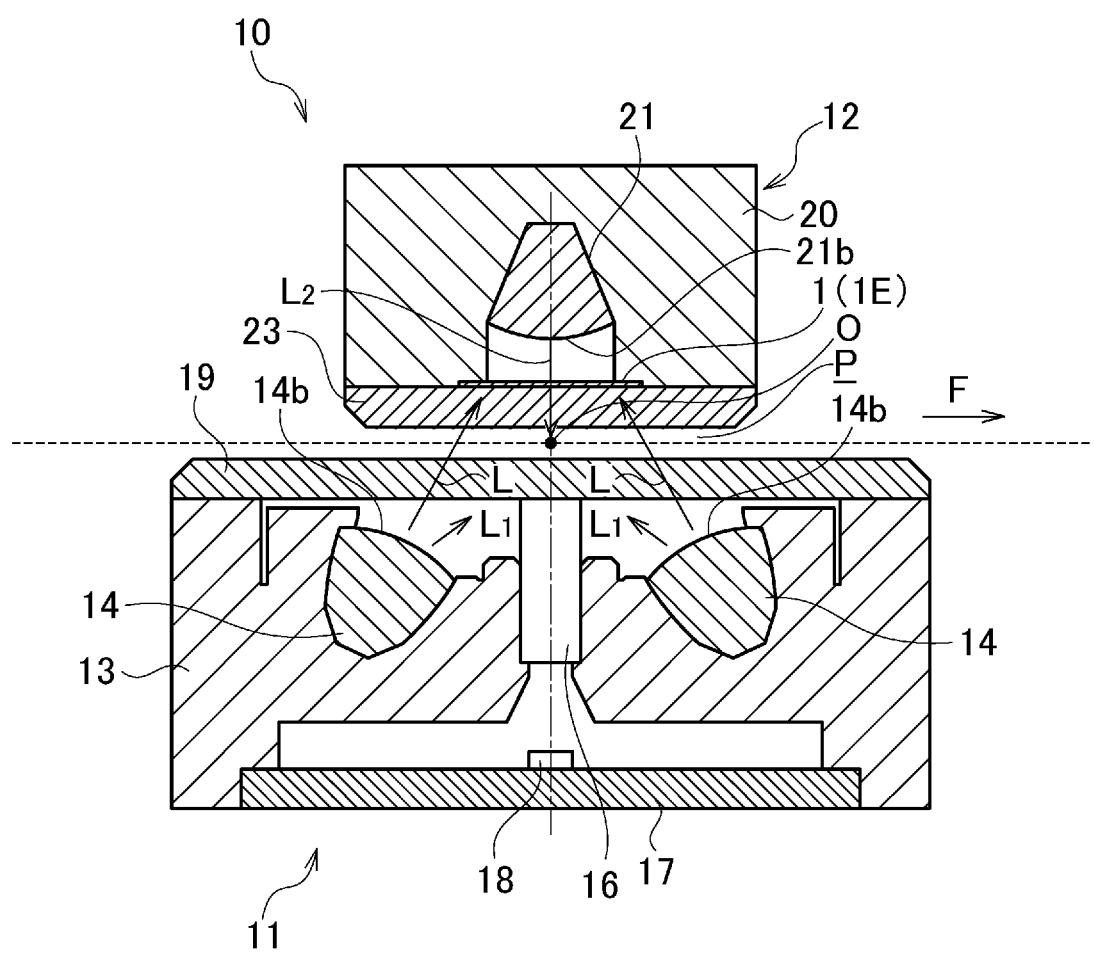
FIG. 13 is a schematic view illustrating a section of an example in which an optical filter is provided as a light blocking member in the image sensor unit according to the present invention.

FIG. 13 shows a further different example of the light blocking member 1 that is disposed between the reflection reading light guides 14 of the image reading portion 11 and the transmission reading light guide 21 of the transmission reading illumination portion 12.

In this example, the light blocking member 1 is constituted, for example, by an optical filter 1E that is affixed to the cover glass 23 in the transmission reading illumination portion 12. In this case, an emission wavelength of the reflection reading light sources 15 of the image reading portion 11 and an emission wavelength of the transmission reading light source 22 of the transmission reading illumination portion 12 are different, and the optical filter 1E is configured to absorb light emitted from the reflection reading light sources 15, that is, the reflection reading light guides 14 of the image reading portion 11, and to transmit light emitted from the transmission reading light source 22, that is, the transmission reading light guide 21 of the transmission reading illumination portion 12.

In this example, particularly in a state in which the bill S is not present on the conveyance path P at a time of reading by the image reading portion 11 and/or in a state in which a watermark portion is read by the image reading portion 11 or the like, light beams (L arrows in FIG. 13) that attempt to enter the transmission reading light guide 21 of the transmission reading illumination portion 12 from the image reading portion 11 side are effectively blocked by being absorbed by the optical filter 1E. In this connection, light that is incident on the transmission reading light guide 21 from the transmission reading light source 22 in the transmission reading illumination portion 12 is irradiated toward the bill S as shown by an arrow $L_2$ in FIG. 13. The light is further transmitted through the optical filter 1E and reaches the bill S.

For the above described case, as an example of a combination of the emission wavelength of the reflection reading light sources 15 of the image reading portion 11 and the emission wavelength of the transmission reading light source 22 of the transmission reading illumination portion 12, for example, a combination may be adopted in which the reflection reading light sources 15 emit green light and the transmission reading light source 22 emits red light. By using the optical filter 1E that absorbs green light, an operating environment can be constructed that transmits red light and absorbs green light.

Note that a wavelength that is absorbed by the optical filter 1E cannot be used as transmitted light. For example, when using the optical filter 1E that absorbs visible light, the wavelengths that can be used as transmitted light are IR and UV wavelengths.

In this case, it is assumed that the reflection reading light sources 15 emit visible light and the transmission reading light source 22 emits infrared light. Therefore, by using the optical filter 1E that absorbs visible light, an operating environment can be constructed that transmits infrared light and absorbs visible light. In this case, by disposing the optical filter 1E on the transmission reading illumination portion 12 side, the optical filter 1E can be utilized as a black background member across the reading position O on the surface of the bill S, and hence an advantage is obtained such that edge detection of the bill S can be effectively performed.

Figure 15:
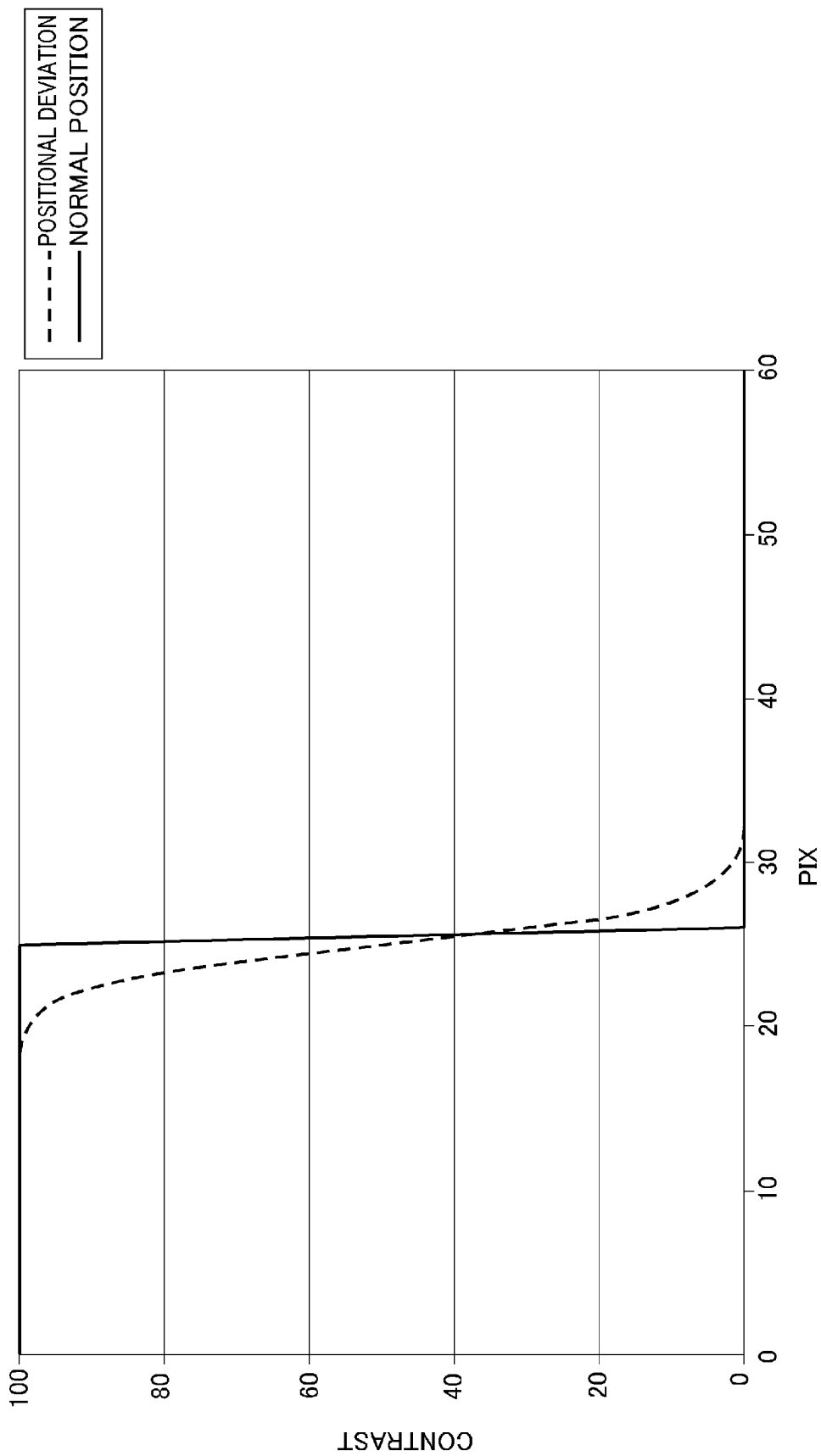
FIG. 15 is a view illustrating an example of a curve of monochrome density changes in FIG. 14.

Further, for example, when white reference members 30 are used for acquiring a white reference value, it is possible to obtain a more accurate white reference value by simultaneously using the optical filter 1E and the white reference members 30. In addition, the positional relationship between the reflection reading illumination portion 11A and the transmission reading illumination portion 12 can be confirmed (see FIG. 14A, FIG. 14B, and FIG. 15) by acquiring a curve of changes in the monochrome density. At this time, it is desirable that the width of the optical filter 1E in the sub-scan direction is equal to or greater than the diameter of a lens of the rod-lens array 16 and that the optical filter 1E contacts the white reference members 30 in the main-scan direction.

The term "white reference value" refers to a reference value that is used when performing shading compensation, and is data for an image that has a uniform white density distribution. Shading compensation is performed to enhance the reproducibility of the tones of the bill S. More specifically, light amount adjustment is performed that makes an illumination light emitted to the bill S an appropriate amount, and gain adjustment is performed that makes an amplification factor with respect to the image signal output of the light receiving element 18 an appropriate amount. In addition, shading compensation is used when compensating for light amount unevenness of the reflection reading light sources 15, the transmission reading light source 22, and the rod-lens array 16, and for sensitivity unevenness of the light receiving element 18 in pixel units.

Figure 16:
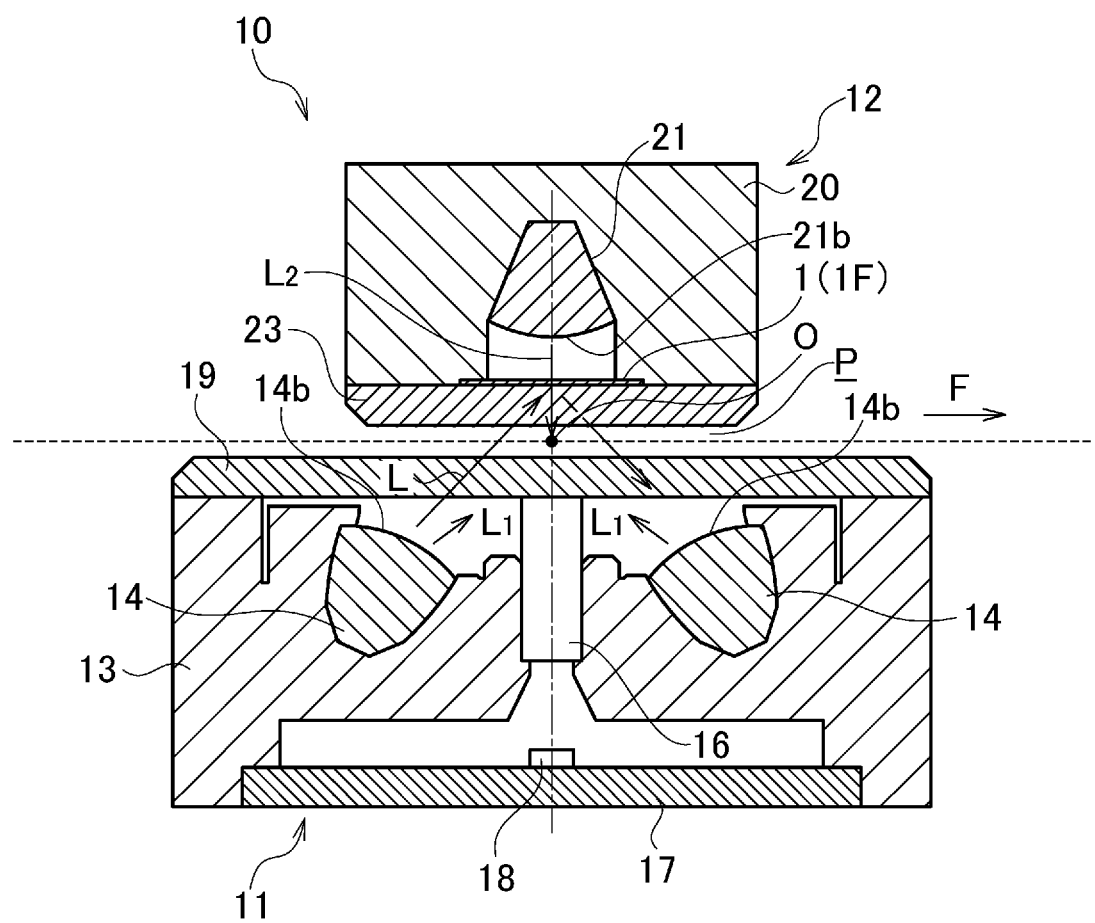
FIG. 16 is a schematic view illustrating a section of an example in which a germanium layer is provided as a light blocking member in the image sensor unit according to the present invention.

FIG. 16 illustrates another different example of the light blocking member 1 that is disposed between the reflection reading light guides 14 of the image reading portion 11 and the transmission reading light guide 21 of the transmission reading illumination portion 12.

In this example, the light blocking member 1 is constituted by a germanium layer 1F that is affixed to, for example, the cover glass 23 in the transmission reading illumination portion 12. In this case, an emission wavelength of the respective reflection reading light sources 15 of the image reading portion 11 and an emission wavelength of the transmission reading light source 22 of the transmission reading illumination portion 12 are different, and the germanium layer 1F is configured to reflect light emitted from the reflection reading light sources 15, that is, the reflection reading light guides 14 of the image reading portion 11, and transmit light emitted from the transmission reading light source 22, that is, the transmission reading light guide 21 of the transmission reading illumination portion 12. In this example, since the light blocking member 1 is constituted by the germanium layer 1F, visible light from the reflection reading light sources 15 is reflected, and infrared light from the transmission reading light source 22 is transmitted.

In this example, particularly in a state in which the bill S is not present on the conveyance path P at a time of reading by the image reading portion 11 and/or in a state in which a watermark portion is read by the image reading portion 11 or the like, light beams (see the L arrow in FIG. 16) that attempt to enter the transmission reading light guide 21 of the transmission reading illumination portion 12 from the image reading portion 11 side are effectively blocked by being reflected by the germanium layer 1F that is in a mirror surface state. In this connection, light that is incident on the transmission reading light guide 21 from the transmission reading light source 22 in the transmission reading illumination portion 12 is irradiated toward the bill S as shown by an arrow $L_2$ in FIG. 16. The light can pass through the germanium layer 1F and reach the bill S.

When using the cover glass 23 to which the germanium layer 1F is affixed, the IR light wavelength can be used as the wavelength of the transmitted light. Therefore, by using the cover glass 23 to which the germanium layer 1F is affixed in combination with the white reference members 30, the same effects can be achieved as in the example using the optical filter 1E that is described above. The same effects also can be achieved when the cover glass 23 is made of germanium.

Figure 17:
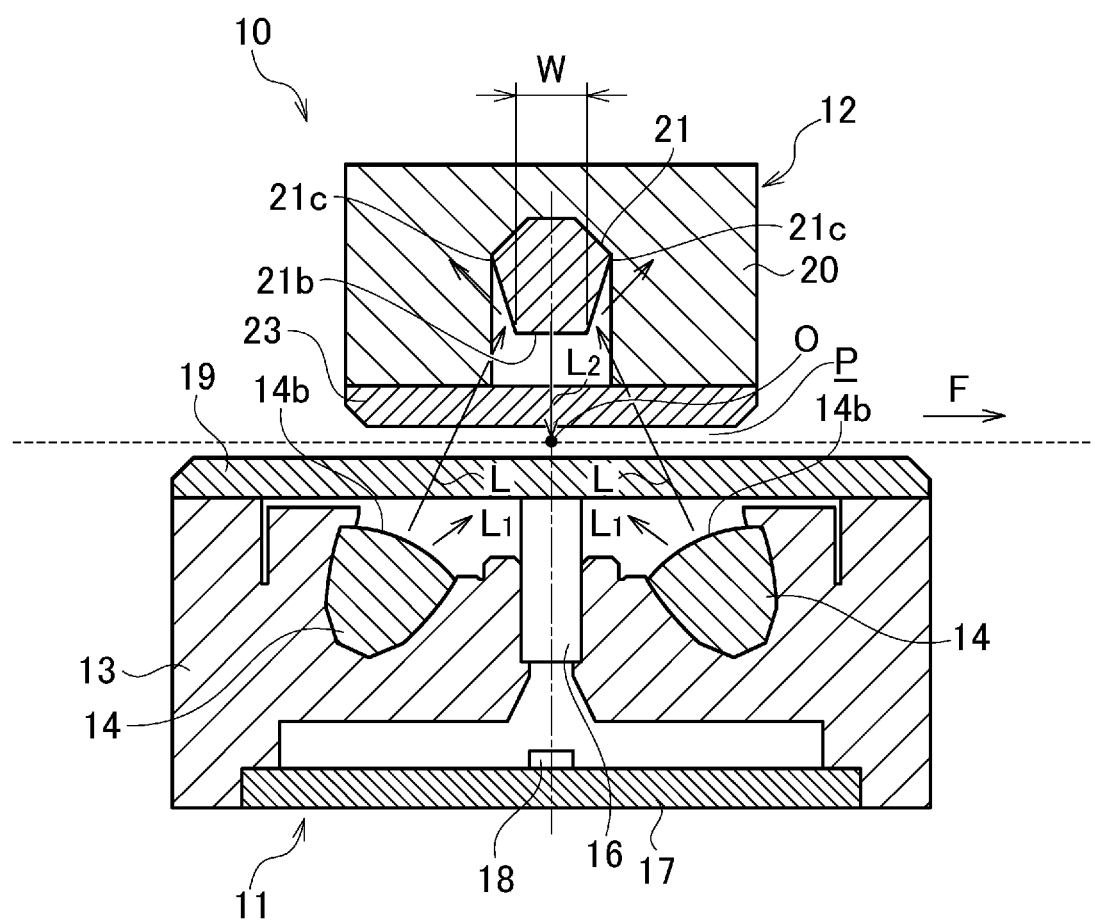
FIG. 17 is a schematic view illustrating a section of an example in which a transmission reading light guide constitutes a light blocking member in the image sensor unit according to the present invention.

In the foregoing embodiments, examples have been described in which the light blocking member 1 is configured as a separate element (including a case of being integrated with the frame 20, the cover glass 19, and the cover glass 23). In addition to such cases in which the light blocking member 1 is configured as a separate element, as shown in FIG. 17, for example, an equivalent configuration can be achieved by means of the transmission reading light guide 21 of the transmission reading illumination portion 12. That is, a width w along the sub-scan direction of the transmitted light emission surface 21b of the transmission reading light guide 21 is narrower than other areas of the transmission reading light guide 21.

By making the width w of the transmitted light emission surface 21b of the transmission reading light guide 21 narrow, it is extremely difficult for light beams (L arrows in FIG. 17) that attempt to enter the transmission reading light guide 21 of the transmission reading illumination portion 12 from the image reading portion 11 side to be incident on the transmission reading light guide 21. More specifically, light that attempts to enter the transmission reading light guide 21 of the transmission reading illumination portion 12 can be substantially blocked.

In addition, as shown in FIG. 17, side surfaces 21c of the transmission reading light guide 21 are set at an angle so as to directly reflect light beams (L arrows in FIG. 17) that attempt to enter the transmission reading light guide 21 of the transmission reading illumination portion 12 from the image reading portion 11 side.

By forming the side surfaces 21c of the transmission reading light guide 21 in this manner, the side surfaces 21c can be made to function substantially as the light blocking member 1.

Although preferred embodiments of the present invention have been described above, the present invention is not limited to these embodiments, and various modifications and alterations can be made without departing from the spirit of the present invention.

The specific numerical values and the like described in the above embodiments are examples according to the present invention, and the present invention is not limited to those numerical values.

What is claimed is:

1. An image sensor unit that performs image reading by reflected light and image reading by transmitted light with respect to an object of illumination, comprising:
    a first light guide that emits light from a first light source toward said object of illumination;
    a second light guide that emits light from a second light source toward said object of illumination;
    an imaging element that focuses light from said object of illumination; and
    a light receiving element that converts light that is collected by said imaging element into an electric signal,
    wherein said second light source and said second light guide are disposed on the opposite side of a conveyance path through which said object of illumination can pass, from said first light source and said first light guide, and
    a light blocking member that continuously blocks a part of light from said first light guide is disposed between said first light guide and said second light guide.

2. The image sensor unit according to claim 1, wherein said light blocking member is disposed on a side of one of said first light guide and said second light guide, and has a slit of a predetermined width.

3. The image sensor unit according to claim 1, wherein said light blocking member is constituted by an optical film that is disposed on an emission surface side of said second light guide.

4. The image sensor unit according to claim 1, wherein an emission wavelength of said first light source and an emission wavelength of said second light source are different, and said light blocking member is constituted by an optical filter that is disposed on an emission surface side of said second light guide.

5. The image sensor unit according to claim 1, wherein an emission surface of said second light guide is narrower than other areas thereof in a sub-scan direction.

6. An image reading apparatus that, while causing an image sensor unit according to claim 1 and said object of illumination to move with respect to each other, reads an image from said object of illumination by said image sensor unit.

* * * * *